(12) United States Patent
Hwang et al.

(10) Patent No.: US 6,753,626 B2
(45) Date of Patent: Jun. 22, 2004

(54) LINEAR MOTOR HAVING AN INTEGRALLY FORMED AIR BEARING

(75) Inventors: Ji Hyun Hwang, Kyungki-do (KR); Do Hyun Kim, Kyoungki-do (KR); Sang Shin Park, Seoul (KR)

(73) Assignee: Mirae Corporation, Choongchungnam-do (KR)

( * ) Notice: Subject to any disclaimer, the term of this patent is extended or adjusted under 35 U.S.C. 154(b) by 4 days.

(21) Appl. No.: 09/946,511

(22) Filed: Sep. 6, 2001

(65) Prior Publication Data

US 2002/0047320 A1 Apr. 25, 2002

(30) Foreign Application Priority Data

Sep. 9, 2000 (KR) ........................................ 2000-53696

(51) Int. Cl.[7] ............................................. H02K 41/00
(52) U.S. Cl. ....................................................... 310/12
(58) Field of Search ............................. 310/12, 13, 14

(56) References Cited

U.S. PATENT DOCUMENTS

| | | | | |
|---|---|---|---|---|
| 4,114,060 A | * | 9/1978 | McLean et al. ............ | 310/163 |
| 4,749,921 A | * | 6/1988 | Chitayat ..................... | 318/135 |
| 4,798,985 A | * | 1/1989 | Chitavat ..................... | 310/90 |
| 5,072,144 A | * | 12/1991 | Saito et al. ................. | 310/12 |
| 5,668,421 A | * | 9/1997 | Gladish ...................... | 310/12 |
| 5,838,079 A | * | 11/1998 | Morohashi et al. ........ | 310/12 |
| 6,215,260 B1 | | 4/2001 | Hinds ......................... | 318/135 |

FOREIGN PATENT DOCUMENTS

JP           63-140657 A   *   6/1988

* cited by examiner

*Primary Examiner*—Thanh Lam
*Assistant Examiner*—Judson H. Jones
(74) *Attorney, Agent, or Firm*—Fleshner & Kim, LLP

(57) ABSTRACT

A linear motor having an air bearing integrally is disclosed. The linear motor includes a "U" shaped frame having permanent magnets spaced from each other on its inner walls, an inverted "U" shaped frame spaced from outer walls of the "U" shaped frame at interval, having an extension frame for protecting the "U" shaped frame and having air injection openings for injecting air into both ends of a center frame, and an armature coil portion installed on the bottom surface of center frame and spaced from the permanent magnets at interval. Accordingly, a step difference between heights generated when the air bearing and the linear motor are installed, can be removed, and the linear motor can be cooled using the air applied to the air bearing.

19 Claims, 3 Drawing Sheets

LINEAR MOTOR HAVING AN INTEGRALLY FORMED AIR BEARING

BACKGROUND OF THE INVENTION

1. Field of the Invention

The present invention relates to a linear motor having an air bearing integrally, and more particularly, to a linear motor having an air bearing for guiding the linear motion of a separately constructed linear motor integrally.

2. Description of the Related Art

Generally, in a linear motor including a stator and a mover, it is necessary that the stator is spaced from the mover at a constant interval in order to directly perform a linear motion. In addition, an air bearing for guiding a precise linear motion is used.

The construction and operation of a conventional linear motor having an air bearing will now be described with reference to the accompanying drawings. FIG. 1 is a side cross-sectional view illustrating the construction of a conventional linear motor and a conventional air bearing. As illustrated in FIG. 1, the linear motor 10 and the air bearing 20 are installed on the bottom surface of a frame 30, being separated from each other at a predetermined interval. The linear motor 10 includes a stator S and a mover M and the air bearing 20 includes an inverted "U" shaped frame 21 and a guide block 22.

The stator S of the linear motor 10 has a "U" shaped frame 11 and a plurality of permanent magnets 12. The permanent magnets 12 are installed on inner walls of the "U" shaped frame 11 at a predetermined interval. The mover M is installed internally in the stator S having the "U" shaped frame 11 and the permanent magnet 12, and has a straight line type frame 13 and an armature coil 14. The armature coil 14 is installed on the bottom surface of the straight line type frame 13, i.e., "−" shaped type. When a thrust force is generated by the interaction between the permanent magnets 12 installed on the inner walls of the "U" shaped frame at the predetermined interval and the armature coil 14, the mover M performs a linear motion in the longitudinal direction of the stator S.

In the case that the mover M performs the linear motion in the longitudinal direction of the stator S, the air bearing 20 is used for keeping a constant interval between the stator S and the mover M or for smoothly stopping the linear motion. The air bearing 20 is constructed such that the inverted "U" shaped frame 21 is installed to protect the guide block 22 fixedly installed on the ground. The air bearing 20 having the inverted "U" shaped frame 21 and the guide block 22 and the linear motor 10 are installed on the bottom surface of the frame 30.

The linear motor 10 is constructed such that the straight line type frame 13 is installed on the bottom surface of the frame 30, and the air bearing 20 is constructed such that the inverted "U" shaped frame 21 is installed on the bottom surface of the frame 30, for thereby supporting the linear motor 10 by the air bearing 30. In order to support the linear motor 10 by the air bearing 20, air is injected into an air supplying pipe 32 in an arrow direction via an air through hole 31 through which the installation surfaces of the frame 30 and the inverted "U" shaped frame 21 are penetrated.

As described above, in the conventional linear motor and air bearing, the thrust force of the linear motor is degraded by installing a separate frame in order to connect the linear motor and the air bearing. In addition, with an asymmetric structure, the rigidity and precision of the linear motor are degraded when a linear motion is conducted by means of the air bearing connected at one side of the linear motor, and a step difference equal to a height h is generated when the linear motor and the air bearing are installed, for thereby causing inconveniency in the installation.

SUMMARY OF THE INVENTION

It is, therefore, an object of the present invention to provide a linear motor having an air bearing integrally.

It is another object of the present invention to provide a linear motor which have a symmetric structure in the linear motion, can be structured simply and can be removed a step difference equal to a height generated when the air bearing and the linear motor are installed.

It is another object of the present invention to provide a linear motor that since the air bearing is formed integrally with the linear motor, the linear motor can be cooled using the air applied to the air bearing.

To achieve the above object, there is provided a linear motor having an air bearing integrally comprising: a "U" shaped frame having a plurality of permanent magnets spaced from each other on its inner walls; an inverted "U" shaped frame spaced from outer walls of the "U" shaped frame at a predetermined interval, having extension frames for protecting the "U" shaped frame and having a plurality of air injection openings for injecting air into both ends of a center frame; and an armature coil unit installed on the bottom surface of the inverted "U" shaped frame and the center frame and spaced from the permanent magnets installed to the inner walls of the "U" shaped frame at a predetermined interval.

In addition, at least one inverted "U" shaped frame is installed in the longitudinal direction of the "U" shaped frame, an air supplying pipes for receiving air from the outside and injecting the same is installed to the air injection openings formed at both ends of the center frame of the inverted "U" shaped frame, and the air supplied to the air injection openings of the inverted "U" shaped frame is supplied between the armature coil unit and the plural permanent magnets.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will now be described with reference to the accompanying drawings.

Figure 1:
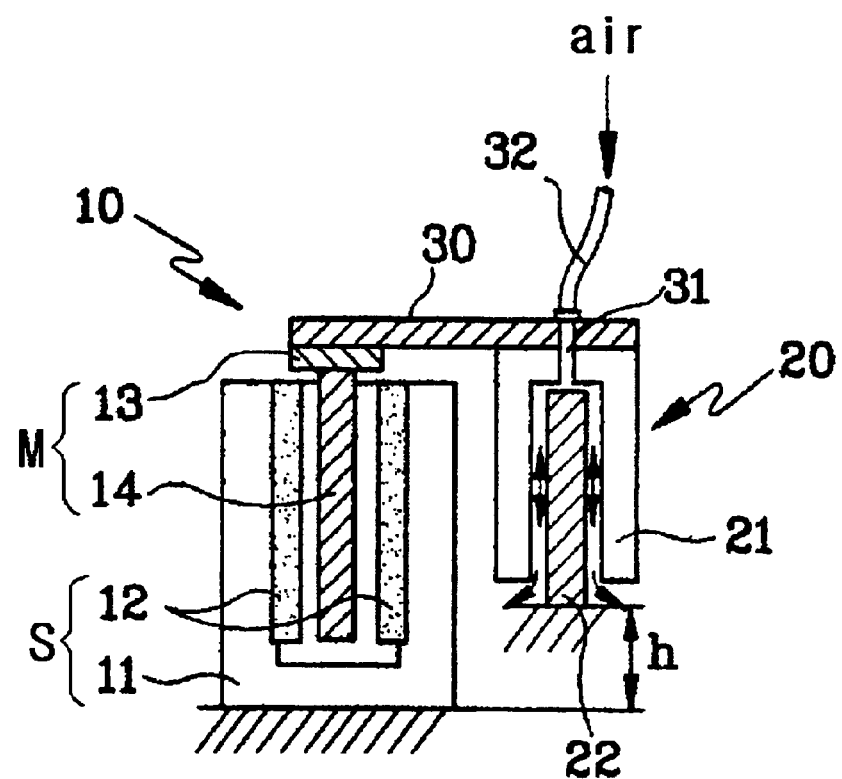
FIG. 1 is a side cross-sectional view illustrating the construction of a conventional linear motor and a conventional air bearing.
Figure 2:
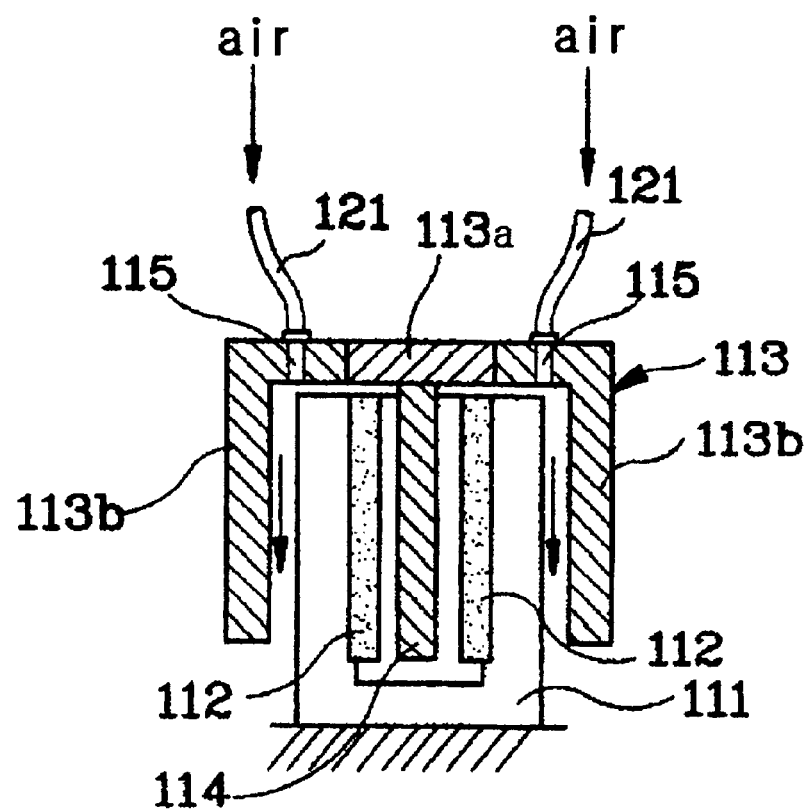
FIG. 2 is a cross-sectional view of a linear motor having an air bearing integrally in accordance with the present invention.
Figure 3:
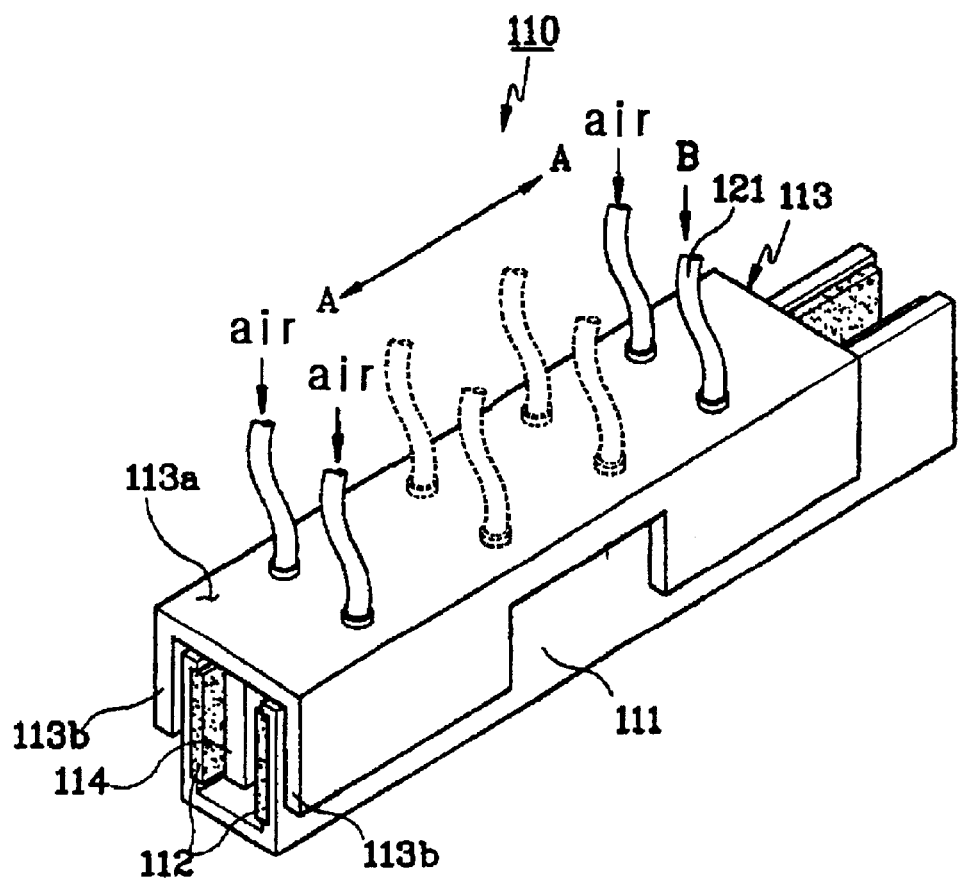
FIG. 3 is a perspective view of the linear motor having an air bearing integrally as shown in FIG. 2.

FIG. 2 is a cross-sectional view of a linear motor having an air bearing integrally in accordance with the present invention. FIG. 3 is a perspective view of the linear motor having an air bearing integrally as shown in FIG. 2.

As illustrated therein, the linear motor 110 includes: a "U" shaped frame 111 having a plurality of permanent magnets 112 spaced from each other on its inner walls; an inverted "U" shaped frame 113 spaced from outer walls of the "U" shaped frame 111 at a predetermined interval, having extension frames 113b for protecting the "U" shaped frame 111 and having a plurality of air injection openings 115 for injecting air into both ends of a center frame 113a; and an armature coil unit 114 installed on the bottom surface of the inverted "U" shaped frame 113 and the center frame 113a and spaced from the permanent magnets 112 installed to the inside of the "U" shaped frame 111 at a predetermined interval.

The construction and operation of the present invention will now be described in more detail.

The linear motor mainly includes a "U" shaped frame 111, an inverted "U" shaped frame and an armature coil unit 114. On inner walls of the "U" shaped frame 111, a plurality of permanent magnets 112 are installed to the inner walls of the "U" shaped frame 111 and thus construct a stator of the linear motor. A mover corresponding to the stator of the linear motor includes an inverted "U" shaped frame 113 and an armature coil unit 114. At this time, the permanent magnets 112 and the armature coil unit 114 can be installed in the opposite position. That is, the armature coil unit 114 can be installed in the stator frame, i.e., the "U" shaped frame 111 and the permanent magnets 112 can be installed in the mover frame, i.e., the inverted "U" shaped frame 113.

The air bearing adapted to the linear motor includes a "U" shaped frame 111 and an inverted "U" shaped frame 113. The inverted "U" shaped frame 113 constructing the air bearing includes a center frame 113a and extension frames 113b extended from both sides of the center frame 113a. The center frame 113a and the extension frames 113b can be formed integrally or can be constructed by installation. With respect to the center frame 113a and the extension frames 113b formed integrally or formed by installation, the extension frames 113b form a right angle with the center frame 113a.

The extension frames 113b can protect the "U" shaped frame by forming a right angle with the center frame 113a. In this case, the center frame 113a is disposed at an open portion of the "U" shaped frame 111 and the extension frames 113b are spaced from an the outer walls of the "U" shaped frame 111 at a predetermined interval. In other words, the extension frames 113b extended from both sides of the center frame 113a are installed to protect the "U" shaped frame 111 so that the inverted "U" shaped frame 113 can be spaced from the outer walls of the "U" shaped frame 111 at a predetermined interval.

In the state where the extension frames 113b are installed to protect the "U" shaped frame 111, the armature coil unit 114 is installed on the bottom surface of the center frame 113a of the inverted "U" shaped frame 113 and keeps a predetermined interval from the plurality of permanent magnets 112 installed internally in the "U" shaped frame 111.

In order to inject air into the space formed between the extension frame 113b and the outer walls of the "U" shaped frame 111, a plurality of air injection openings 115 for injecting air is formed at both ends of the center frame 113a. At the air injection openings 115 formed at both ends of the center frame 113a, air supplying pipes 121 for receiving air from the outside and injecting the same is provided. The air supplied to the air supplying pipes 121 is injected into the space formed between the extension frames 113b and the outer walls of the "U" shaped frame 111 via the air injection openings 115, for thereby performing the function of the air bearing.

With respect to the plurality of air injection openings 115 formed in the inverted "U" shaped frame 113, as illustrated in FIG. 3, the air supplying pipes 121 inserted into the air injection openings 115 can be removed and then inserted into the air injection openings 115 formed in section A as occasion demands.

The air injected into the space formed between the extension frames 113b and the outer walls of the "U" shaped frame 111 via the air injection openings 115 can be supplied between the armature coil unit 114 and the plurality of permanent magnets 112 installed on the inner walls of the "U" shaped frame 111 for the purpose of cooling the linear motor.

In addition, as illustrated in FIG. 3, at least one inverted "U" shaped frame 113 of the air bearing in accordance with the present invention, in which the air applied to the air bearing can be used for the purpose of cooling the linear motor, can be constructed in the longitudinal direction of the "U" shaped frame 111.

As seen from above, the linear motor having the air bearing integrally in accordance with the present invention can be structured simply and have a symmetric structure in the linear motion of the linear motor by forming the air bearing integrally with the linear motor.

In addition, by forming the air bearing integrally with the linear motor, a step difference equal to a height generated when the air bearing and the linear motor are installed can be removed and the linear motor can be cooled using the air applied to the air bearing.

As seen from above, according to the present invention, there is provided an effect that the linear motor having the air bearing integrally in accordance with the present invention can be structured simply and have a symmetric structure in the linear motion of the linear motor by forming the air bearing integrally with the linear motor.

In addition, according to the present invention, there is also provided to an effect that by forming the air bearing integrally with the linear motor, a step difference equal to a height generated when the air bearing and the linear motor are installed can be removed and the linear motor can be cooled using the air applied to the air bearing.

What is claimed is:

1. A linear motor, comprising:
an upright U-shaped stator comprising a first arm and a second arm defining a U-shaped channel therebetween;
a plurality of magnets mounted on inner surfaces of the first and second arms;
an inverted U-shaped mover mounted over the stator and comprising:
a center frame;
first and second outer arms depending from opposite ends of the center frame to form an inverted U-shaped channel, wherein the first and second arms of the stator are positioned at least partially within the U-shaped channel of the mover; and
an armature coil depending from a center of the center frame such the armature coil extends into the U-shaped channel of the upright U-shaped stator; and
air injection openings in the mover configured to direct air between the stator and the mover to form an air bearing therebetween.

2. The linear motor of claim 1, wherein the plurality of magnets comprise a plurality of permanent magnets.

3. The linear motor of claim 1, wherein the air injection openings in the mover are also configured to direct air between the first and second arms of the U-shaped stator and the first and second outer arms of the mover, respectively.

4. The linear motor of claim 1, wherein the mover is symmetrical about a longitudinal centerline.

5. A linear motor, comprising:
an upright U-shaped stator comprising a first arm and a second arm defining a U-shaped channel therebetween;
a plurality of magnets mounted on inner surfaces of the first and second arms;
an inverted U-shaped mover mounted over the stator and comprising:
a center frame;
first and second outer arms depending from opposite ends of the center frame to form an inverted U; and
an armature coil depending from a center of the center frame such the armature coil extends into the upright U-shaped stator; and
air injection openings in the mover configured to direct air between the stator and the mover to form an air bearing therebetween, wherein the air injection openings in the mover are also configured to direct air between the first and second arms of the U-shaped stator and the first and second outer arms of the mover, respectively, and wherein the first outer arm of the inverted U shaped mover and the armature coil define a first inverted U-shaped channel, wherein the second outer arm of the inverted U shaped mover and the armature coil define a second inverted U-shaped channel, wherein the first arm of the stator is configured to be disposed in the first inverted U-shaped channel, and wherein the second arm of the stator is configured to be disposed in the second inverted U-shaped channel.

6. The linear motor of claim 5, wherein a first air injection opening is disposed in a bottom of the first inverted U-shaped channel, and a second air injection opening is disposed in a bottom of the second inverted U-shaped channel.

7. The linear motor of claim 6, further comprising a plurality of air supply pipes that are coupled to respective ones of the air injection openings, and wherein the air supply pipes are configured to be removably attached to a back of the mover.

8. The linear motor of claim 5, wherein the air injection openings comprise:
a first plurality of air injection openings disposed along a length of the first inverted U-shaped channel; and
a second plurality of air injection openings disposed along a length of the second inverted U-shaped channel.

9. A linear motor, comprising:
a stator comprising a first arm and a second arm defining an upright U-shaped channel therebetween;
an inverted U-shaped mover mounted over the stator and comprising:
a center frame;
first and second outer arms depending from opposite ends of the center frame to form an inverted U-shaped channel, wherein the first and second arms of the stator are positioned at least partially within the U-shaped channel of the mover;
a central arm depending from the center frame and into the U-shaped channel of the stator; and
a plurality of air injection openings in the center frame, wherein the air injection openings are configured to direct air between the stator and the mover to form an air bearing therebetween.

10. The linear motor of claim 9, further comprising:
a plurality of magnets mounted on one of the mover and the stator; and
an armature coil mounted on the other of the mover and the stator.

11. The linear motor of claim 10, wherein the plurality of magnets are mounted on inner sides of the first and second arms of the stator, and wherein the armature coil is mounted on the central arm of the mover such that the armature is positioned between the plurality of magnets on the first and second arms of the stator.

12. The linear motor of claim 9, wherein the air injection openings in the mover are also configured to direct air between the first and second arms of the stator and the first and second outer arms of the mover, respectively.

13. A linear motor, comprising:
a stator comprising a first arm and a second arm defining an upright U-shaped channel therebetween;
an inverted U-shaped mover mounted over the stator and comprising:
a center frame;
first and second outer arms depending from opposite ends of the center frame to form an inverted U;
a central arm depending from the center frame and into the U-shaped channel of the stator; and
a plurality of air injection openings in the center frame, wherein the air injection openings are configured to direct air between the stator and the mover to form an air bearing therebetween, wherein the first outer arm and the center arm of the mover define a first inverted U-shaped channel, wherein the second outer arm and the center arm of the mover define a second inverted U-shaped channel, wherein the first arm of the stator is configured to be disposed in the first inverted U-shaped channel, and wherein the second arm of the stator is configured to be disposed in the second inverted U-shaped channel.

14. The linear motor of claim 13, wherein a first air injection opening is disposed in a bottom of the first inverted U-shaped channel, and a second air injection opening is disposed in a bottom of the second inverted U-shaped channel.

15. The linear motor of claim 13, wherein the air injection openings comprise:
a first plurality of air injection openings disposed along a length of the first inverted U-shaped channel; and
a second plurality of air injection openings disposed along a length of the second inverted U-shaped channel.

16. The linear motor of claim 15, wherein a plurality of permanent magnets are mounted on inner sides of the first and second arms of the stator, and wherein an armature coil is mounted on the center depending arm of the mover.

17. The linear motor of claim 16, wherein air introduced through the air injection openings acts to cool the linear motor.

18. The linear motor of claim 16, further comprising a plurality of air supply pipes that are coupled to respective ones of the air injection openings, and wherein the air supply pipes are configured to be removably attached to a back of the mover.

19. The linear motor of claim 16, wherein the mover is symmetric about a central longitudinal axis.

* * * * *